US009086055B2

(12) United States Patent
Subramaniam et al.

(10) Patent No.: US 9,086,055 B2
(45) Date of Patent: Jul. 21, 2015

(54) LUBRICATION OF FLUID TURBINE GEARBOX DURING IDLING OR LOSS OF ELECTRIC GRID

(75) Inventors: Pradip Radhakrishnan Subramaniam, Bangalore (IN); Edwin Hidding, Rhede (DE); Michael Jay Burkett, Lyman, SC (US); Stephen Bertram Johnson, Greenville, SC (US); Mayank Tiwari, Bangalore (IN)

(73) Assignee: General Electric Company, Niskayuna, NY (US)

( * ) Notice: Subject to any disclaimer, the term of this patent is extended or adjusted under 35 U.S.C. 154(b) by 244 days.

(21) Appl. No.: 12/977,149

(22) Filed: Dec. 23, 2010

(65) Prior Publication Data

US 2011/0168495 A1  Jul. 14, 2011

Related U.S. Application Data

(63) Continuation-in-part of application No. 12/685,137, filed on Jan. 11, 2010.

(51) Int. Cl.
*F16H 57/04* (2010.01)
*F03D 11/00* (2006.01)
*F16H 61/12* (2010.01)

(52) U.S. Cl.
CPC ......... *F03D 11/0008* (2013.01); *F05B 2260/98* (2013.01); *F16H 57/045* (2013.01); *F16H 57/0409* (2013.01); *F16H 57/0447* (2013.01); *F16H 57/0457* (2013.01); *F16H 61/12* (2013.01); *Y02E 10/722* (2013.01)

(58) Field of Classification Search
CPC . Y02E 10/722; F03D 11/008; F16H 57/0409; F16H 57/0447; F16H 57/045

USPC ..... 184/6.4, 6.12, 6.22, 4; 416/146 A, 170 R, 416/174; 290/44; 508/128, 391; 251/77, 251/129.2
See application file for complete search history.

(56) References Cited

U.S. PATENT DOCUMENTS

| | | | |
|---|---|---|---|
| 3,712,420 A | 1/1973 | Pelizzone et al. | |
| 4,284,174 A | 8/1981 | Salvana et al. | |
| 4,717,000 A | 1/1988 | Waddington et al. | |
| 4,976,335 A | 12/1990 | Cappellato | |
| 5,121,815 A | 6/1992 | Francois et al. | |
| 5,413,308 A * | 5/1995 | Hayes | 251/77 |
| 5,474,107 A * | 12/1995 | Hayes | 137/625.5 |
| 7,387,189 B2 | 6/2008 | James et al. | |
| 2005/0000753 A1 | 1/2005 | Sheridan | |

(Continued)

FOREIGN PATENT DOCUMENTS

GB  2201200 A  *  8/1988  ............. F16N 29/00
WO  2009147147 A2  12/2009

OTHER PUBLICATIONS

European Search Report and Written Opinion From corresponding Application No. EP11150433, mailed on Apr. 15, 2011.

*Primary Examiner* — William E Dondero
*Assistant Examiner* — Robert T Reese
(74) *Attorney, Agent, or Firm* — Ann M. Agosti

(57) ABSTRACT

A lubrication system for a fluid turbine is provided. The system includes a supply subsystem for providing oil via an oil tank or a hydraulic accumulator to a gearbox of the fluid turbine for lubrication during at least one of idling or loss of electric grid. The system also includes a control subsystem for controlling the flow in the lubrication system.

12 Claims, 2 Drawing Sheets

(56) References Cited

U.S. PATENT DOCUMENTS

| | | | |
|---|---|---|---|
| 2005/0051387 A1* | 3/2005 | Flamang et al. | 184/6.12 |
| 2007/0080666 A1* | 4/2007 | Ritter et al. | 320/128 |
| 2008/0178833 A1* | 7/2008 | Restivo et al. | 123/196 R |
| 2008/0248979 A1* | 10/2008 | Nakagawa et al. | 508/128 |
| 2009/0114480 A1* | 5/2009 | Madge et al. | 184/6.12 |
| 2009/0191060 A1* | 7/2009 | Bagepalli et al. | 416/174 |
| 2010/0135793 A1* | 6/2010 | Krauss | 416/1 |
| 2011/0024236 A1* | 2/2011 | Yano et al. | 184/6.12 |
| 2011/0150655 A1* | 6/2011 | Tietze et al. | 416/170 R |

\* cited by examiner

LUBRICATION OF FLUID TURBINE GEARBOX DURING IDLING OR LOSS OF ELECTRIC GRID

CROSS REFERENCE TO RELATED APPLICATIONS

This application is a Continuation in Part application to U.S. patent application Ser. No. 12/685,137, entitled "LUBRICATION OF FLUID TURBINE GEARBOX DURING IDLING OR LOSS OF ELECTRIC GRID," filed Jan. 11, 2009, which is herein incorporated by reference in its entirety.

BACKGROUND

The invention relates generally to a lubrication of a gearbox and more particularly, to a system of lubricating a fluid turbine gearbox during idling or loss of electric grid.

In general, a wind turbine gearbox is supplied with oil for lubricating the bearings and meshing gears of the gearbox by a conventionally operated electrical pump. Such pumps may be efficiently operated for lubrication during on grid conditions, thereby, making use of the electric power generated from the turbine. But, during the time of no electric grid or idling, the conventional electrically operated pump cannot be used to supply the oil to the various components of the gearbox including the bearings and meshing gears unless a backup power source is available. The use of an auxiliary power source leads to additional costs and is not generally preferable in view of high cost of operation of the lubrication system. Some other typical wind turbine gearbox lubrication systems include a mechanically coupled geared pump for providing lubricating oil to the gearbox. Such pumps are attached to a gearbox shaft on the blade side of the wind turbine or generator side of the wind turbine. However, during emergency conditions such as failure of the mechanically coupled geared pump or maintenance of the electrically operated pump, supply of lubricating oil to the gearbox may not be available. This causes excessive heating of the components of the gearbox and may lead to failure due to increased stresses. Although wind turbine gearboxes are described herein for purposes of illustration, such embodiments are useful for other types of fluid turbines such as marine hydrokinetic energy devices, for example.

Accordingly, there exists a need for an efficient lubrication system for lubricating a fluid turbine gearbox during loss of electric grid, idling or any other emergency conditions.

BRIEF DESCRIPTION

In accordance with an embodiment of the invention, a lubrication system for a fluid turbine is provided. The system includes a supply subsystem for providing oil via an oil tank or a hydraulic accumulator to a gearbox of the fluid turbine for lubrication during at least one of idling or loss of electric grid. The system also includes a control subsystem for controlling the flow in the lubrication system.

In accordance with another embodiment of the invention, a lubrication system for a fluid turbine is provided. The system includes a hydraulic accumulator for providing oil to a gearbox of the fluid turbine for splash lubrication during idling or loss of electric grid. The system also includes a control subsystem for controlling a plurality of direction control valves and a plurality of drain ports configured to control the flow of oil in the lubrication system. The system further includes a drain tank for collecting the oil flowing out of the gearbox and an auxiliary pump for pumping the oil from the drain tank to the accumulator.

In accordance with yet another embodiment, a lubrication system for a fluid turbine is provided. The system includes an oil tank for providing oil to a gearbox of the fluid turbine for splash lubrication during idling or loss of electric grid. The system also includes a control subsystem for controlling a plurality of direction control valves and a plurality of drain ports configured to control the flow of oil in the lubrication system. The system further includes a drain tank for collecting the oil flowing out of the gearbox and an auxiliary pump for pumping the oil from the drain tank to the oil tank.

In accordance with another embodiment, a method for lubricating a fluid turbine gearbox is provided. The method includes providing a supply subsystem for supplying oil to the gearbox for splash lubrication during loss of electric grid or idling. The method further also controlling a plurality of direction control valves and a plurality of drain ports using a control subsystem for allowing controlled flow of oil. Further, the method includes collecting the oil flowing out of the gearbox in a drain tank and recycling the oil collected in the drain tank by pumping the oil to the supply subsystem.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the invention are directed towards a lubrication system of a fluid turbine gearbox during loss of electric grid or idling. As used herein, the phrase "loss of electric grid" or "grid loss" refers to a condition when the fluid turbine is not connected to the electrical power grid, or the electrical power grid is not functioning and thus cannot provide electrical power to the electrical pump. Further, the terms "on-grid" or "electric grid" refers to a condition when the fluid turbine is connected to the electrical power grid, and the electrical power grid is functioning and thus can provide electrical power to the electrical pump. Embodiments of the present invention address systems of providing lubricating oil to the fluid turbine gearbox using a subsystem, which subsystem includes an oil tank or a hydraulic accumulator. Embodiments of the present invention also include a method of lubricating the fluid turbine gearbox and effectively converting the dry sump fluid turbine gearbox to a wet sump fluid turbine gearbox, thereby, providing for splash lubrication within the gearbox. Further, the terms "normally open" and "normally closed" as used in the present application, refer to positions of control valves when the control valves are receiving no activating control signal during loss of grid or during complete loss of electricity in the system. Although wind turbine gearboxes are described herein for purposes of illustration, such embodiments are useful for other types of fluid turbines such as marine hydrokinetic energy turbines, for example.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
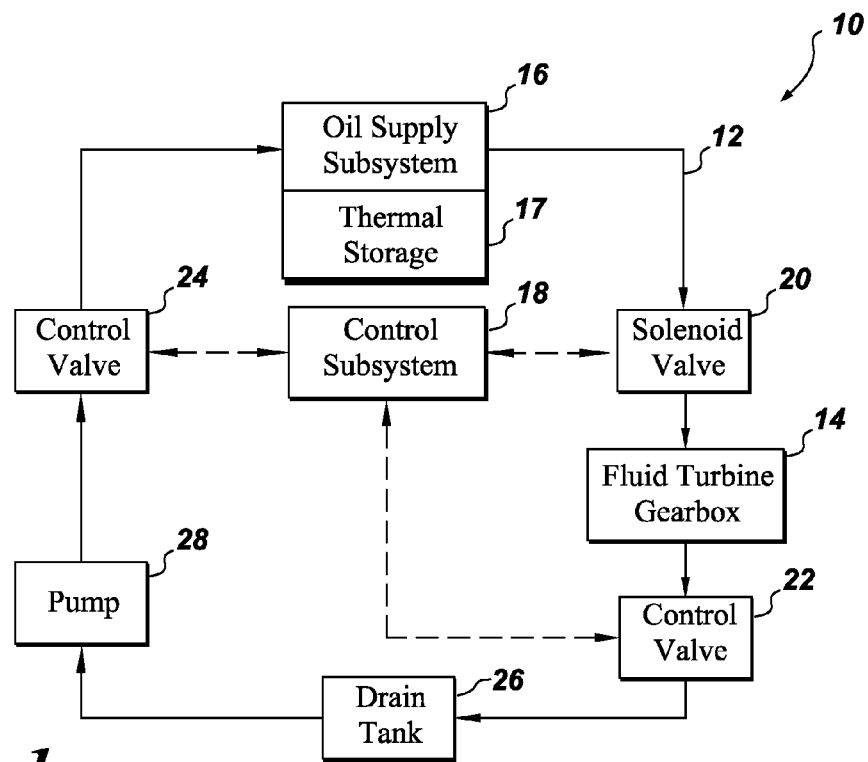
FIG. 1 is a schematic flow diagram of an embodiment of the invention illustrating a flow of lubricating oil in the lubrication system.

FIG. 1 schematically depicts a lubrication system 10 for providing a lubricating oil 12 to a wind turbine gearbox 14 in accordance with an exemplary embodiment of the invention. The lubrication system 10 includes an oil-supply subsystem 16 for providing the lubricating oil 12 to the wind turbine gearbox 14 for lubrication. The oil-supply subsystem 16 includes an oil tank or an accumulator for providing the lubricating oil 12 to the wind turbine gearbox 14. In one embodiment the oil-supply subsystem 16 includes both an oil tank and an accumulator for providing the lubricating oil 12 to multiple components of the wind turbine gearbox 14. In another embodiment, the lubrication system 10 also includes a manifold with multiple nozzles in the wind turbine gearbox 14 for providing a flow of pressurized lubricating oil 12 to multiple components of the wind turbine gearbox 14 during discharging of the oil-supply subsystem 16. The lubrication system 10 also includes a control subsystem 18 for controlling the flow of the lubricating oil 12 in the lubrication system. The control subsystem 18 further controls multiple control valves 20, 22, 24 and multiple drain ports for controlling the lubricating oil 12 flowing in the lubrication oil cycle as shown in FIG. 1. In one embodiment, the control valves 20, 22 and 24 include direction control valves allowing controlled flow of the lubricating oil 12 in a particular direction. In another embodiment, the direction control valves includes multiple solenoid valves and check valves.

In one embodiment, the wind turbine gearbox 14 is generally a dry sump gearbox. During grid loss or idling, the lubricating oil 12 from the oil-supply subsystem 16 is provided to the wind turbine gearbox 14 such that the lubricating oil 12 fills up the wind turbine gearbox 14 up to an optimal level, thereby, converting the dry sump gearbox to a wet sump gearbox. In one embodiment, the optimal level is a level in the wind turbine gearbox 14 when gear bearings are fully submerged under the lubricating oil level in the bottom of rotating carrier housing of the wind turbine gearbox 14. The lubricating oil in the gearbox 14 is splashed due to rotation of the planetary gear section resulting in lubrication of the bearings and gears. Thus, the wet sump gearbox provides for splash lubrication of the wind turbine gearbox 14 during grid loss or an idling condition.

Furthermore, the lubrication system 10 includes a drain tank 26 for collecting oil 12 flowing out of the wind turbine gearbox 14. The drain tank 26 stores the lubricating oil 12 temporarily during an on-grid condition prior to the charging of the oil supply subsystem 16. Further, during charging of the oil supply subsystem 16, the lubricating oil 12 stored in the drain tank 26 is pumped from the drain tank 26 to the oil supply subsystem 16 by a pump 28. The lubrication system 10 also includes multiple drain ports (not shown) located at the bottom region of the wind turbine gearbox 14. The multiple drain ports are operated by control vale 22, which control valve is normally closed during the discharging of the oil-supply subsystem 16 and open during charging of the oil-supply subsystem 16 to allow flow of the lubricating oil 12.

The size of drain tank 26 and the amount of pumping of pump 28 required can be controlled to some extent by the chemical composition of the lubricating oil and/or by additives to the lubricating oil. The oil composition, including optional additives, is selected based on thermal and lubrication properties. The lubricating oil may comprise mineral or synthetic oil having a desired viscosity which will depend to some extent upon the environment in which the fluid turbine will be used. Examples of potentially useful additives include nano-particles comprising materials such as aluminum oxide, titanium oxide, silver oxide, or combinations thereof. If temperatures are too low for the lubricating oil to flow properly from the oil supply subsystem 16, in one embodiment, a thermal storage device 17, comprising a phase change material, for example, may be charged while the wind turbine is operating under "normal operating conditions" (that is, is not experienced idling and grid loss and has sufficient power available for lubrication functions without use of the lubrication control functionality described herein) and is then available for use in maintain the oil supply subsystem at an appropriate temperature under grid loss or idling conditions.

As illustrated, the control subsystem 18 includes a control logic for controlling the opening and closing of the multiple control valves 20, 22, 24 and the multiple drain ports in a sequence of operations for optimal performance of the lubrication system 10. In one embodiment, the control subsystem 18 may include a computer system having a processor, which processor employs the control logic for controlling the multiple control valves 20, 22, 24 and the multiple drain ports in a sequence of events during charging or discharging of the oil-supply subsystem 16 in the lubrication system 10. In another embodiment, the control subsystem 18 is provided with an auxiliary power supply for operation of the control valves 20, 22, 24 under loss of electric grid and idling condition. In yet another embodiment, the wind turbine gearbox 14 may have sensors for sensing and maintaining an optimal level of lubricating oil 12 stored in the gearbox 14 during oil discharge from the oil supply subsystem to the wind turbine gearbox 14. The computer system is further adapted to be in signal communication with the sensors. It should be noted that embodiments of the invention are not limited to any particular processor for performing the processing tasks of the invention. The term "processor," as that term is used herein, is intended to denote any machine capable of performing the calculations, or computations, necessary to perform the tasks of the invention. The term "processor" is also intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art.

Figure 2:
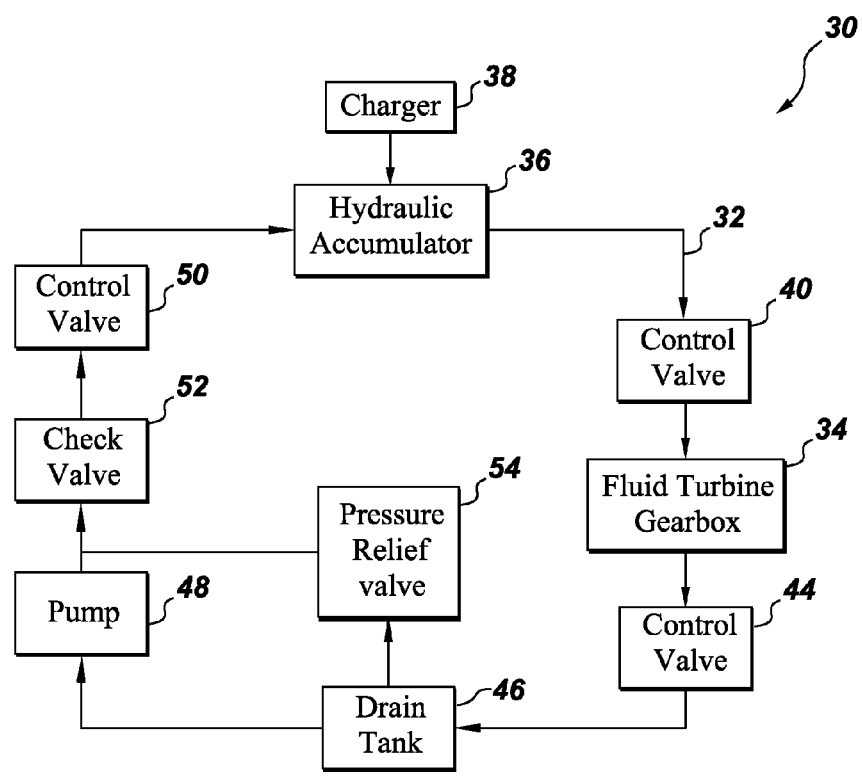
FIG. 2 is a schematic flow diagram of another embodiment of the invention illustrating a flow of lubricating oil in the lubrication system.

FIG. 2. illustrates a lubrication system 30 for providing a lubricating oil 32 to a wind turbine gearbox 34 in accordance with an exemplary embodiment of the invention. The lubrication system 30 includes a hydraulic accumulator 36 for providing lubricating oil 32 to a wind turbine gearbox 34 of the wind turbine for splash lubrication during idling or loss of electric grid. In one embodiment, the hydraulic accumulator 36 is provided at any convenient location in a wind turbine system. The hydraulic accumulator 36 includes a pressurized tank or a pressure storage reservoir containing a pressurized fluid, typically a gas, and the lubricating oil 32. The hydraulic accumulator 36 provides lubricating oil 32 at an optimal pressure to the wind turbine gearbox 34. In another embodiment, the hydraulic accumulator 36 provides lubricating oil 32 to the wind turbine gearbox 34 by gravity. In a non-limiting example, the pressurized gas includes a nitrogen gas. The hydraulic accumulator 36 is filled up with the gas and the oil at different pressures separated by a diaphragm. In one embodiment, the pressure of the gas is four times more than the pressure of oil in the hydraulic accumulator 36. It is to be noted that the pressure of the gas may be more or less than four times than the pressure of oil in the hydraulic accumulator 36. In one embodiment, the hydraulic accumulator 36 is occasionally charged with the gas supplied by a charger 38 if a bladder pressure of the hydraulic accumulator 36 is reduced below a predetermined pressure level.

Furthermore, during idling or grid loss, the lubricating oil 32 is dispensed from the hydraulic accumulator 36 to the wind turbine gearbox 34 through a control valve 40. In one embodiment, the control valve 40 is a directional control valve. In a non-limiting example, the directional control valve is operated by a solenoid or switch. In another embodiment, the control valve 40 is a normally open direction control valve such that electricity (to enable the closed switching command to reach the valve from the control subsystem) is required to maintain it in a closed position during normal operating conditions. During discharging of the hydraulic accumulator 36, the normally open direction control valve 40 may open, thereby, allowing lubricating oil 32 to flow from the hydraulic accumulator 36 to the wind turbine gearbox 34. Another control valve 44 operates for allowing unidirectional flow of lubricating oil 32 from the wind turbine gearbox 34 to a drain tank 46. In yet another embodiment, the control valve 44 is a normally closed direction control valve. During discharging of the hydraulic accumulator 36, the normally closed direction control valve 44 may close, thereby preventing any flow of the lubricating oil 32 from the wind turbine gearbox 34 to the drain tank 46. It should be noted that the operation of multiple control valves, check valves and drain ports may be performed by a control subsystem (not shown). Such a control subsystem may employ a control logic for operating the valves and the drain ports in a sequence of events during charging and discharging of the lubrication system 30. In one embodiment, multiple control valves 40 are used with at least one of the control valves directing oil to a selected component of the gearbox when initiating the flow of lubricating oil to the gear box. The component may comprise one or more bearings, gear meshes, and/or splines. Selectively supplying lubricating oil at the start of the run-in process provides early lubrication to minimize any potential rubbing. Another of the control valves may then be used to supply larger quantities of oil to the gearbox for splash lubrication purposes.

During on-grid conditions, the lubrication system 30 as illustrated in FIG. 2 may be in operation for charging the hydraulic accumulator 36. The charging of the hydraulic accumulator 36 includes pumping the lubricating oil 32 from the drain tank 46 to the hydraulic accumulator 36 by a pump 48. Non-limiting examples of the pump 48 include an auxiliary pump or a scavenge pump or a main electrical pump. The lubricating oil 32 is pumped from the drain tank 46 to the hydraulic accumulator 36 through a control valve 50. In one embodiment, the control valve 50 is a normally closed directional control valve. The control valve 50 is opened to allow filling up of the hydraulic accumulator 36 to an optimal level and pressure during charging. During discharging, the control valve 50 does not operate, thereby, preventing filling of the hydraulic accumulator 36 with the lubricating oil 32. In one embodiment, the lubrication system 30 also includes a check valve 52 provided further in the flow line of lubricating oil 32 from the pump 48 to the control valve 50. The lubrication system 30 also includes a pressure relief valve 54 located after the pump 48 for relieving any excess pressure in the flow line of the lubrication system 30 and the check valve 52 for preventing reverse flow.

Figure 3:
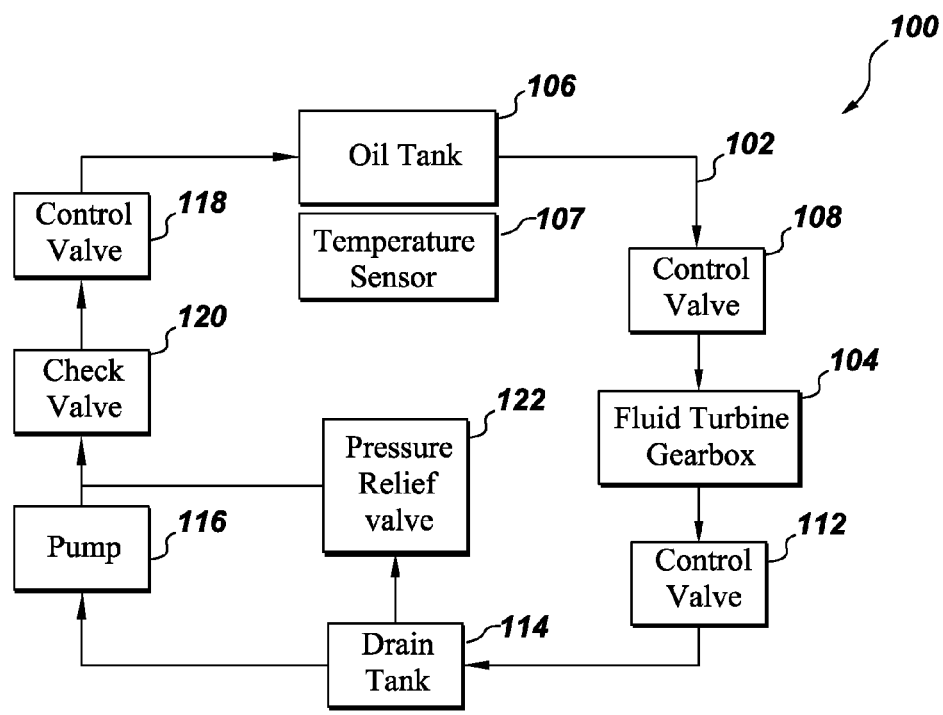
FIG. 3 is a schematic flow diagram of yet another embodiment of the invention illustrating a flow of lubricating oil in the lubrication system.

FIG. 3. illustrates a schematic flow diagram of another embodiment of a lubrication system 100 for providing a lubricating oil 102 to a wind turbine gearbox 104 in accordance with an exemplary embodiment of the invention. The lubrication system 100 includes an oil tank 106 provided at a predefined elevation above the wind turbine gearbox 104 for supplying lubricating oil 102 to the wind turbine gearbox 104 by gravity. The oil tank may be placed inside or outside a nacelle of the fluid turbine. If placed outside the nacelle, the oil tank and oil tank to nacelle connection should be sufficiently sealed from the external environment to avoid contamination. The lubricating oil 102 is dispensed from the oil tank 106 to the wind turbine gearbox 104 through a control valve 108 by gravity. In one embodiment, the lubricating oil 102 is dispensed from the oil tank 106 to the wind turbine gearbox 104 at a particular pressure. In another embodiment, the control valve 108 is a directional control valve. In yet another embodiment, the control valve 108 is a normally open direction control valve. During discharging of the oil tank 106, the normally open direction control valve 108 may open, thereby, allowing lubricating oil 102 to flow from the oil tank 106 to the wind turbine gearbox 104 by gravity. Another control valve 112 operates allowing the unidirectional flow of lubricating oil 102 from the wind turbine gearbox 104 to a drain tank 114. In yet another embodiment, the control valve 112 is a normally closed direction control valve. During discharging of the oil tank 106, the normally closed direction control valve 112 may close, thereby preventing any flow of the lubricating oil 102 from the wind turbine gearbox 104 to the drain tank 114. It should be noted that the operation of multiple control valves, check valves and drain ports may be performed by a control subsystem (not shown). Such a control subsystem may employ a control logic for operating the valves and ports in a sequence of events during charging and discharging of the lubrication system 100.

Furthermore, during on-grid conditions, the lubrication system 100 as illustrated in FIG. 3 may be in operation for charging the oil tank 106. The charging of the oil tank 106 includes pumping the lubricating oil 102 from the drain tank 112 to the oil tank 106 by a pump 116. Non-limiting examples of the pump 116 includes an auxiliary pump or a scavenge pump or a main electrical pump. The lubricating oil 102 is pumped to the oil tank 106 through a control valve 118. In one embodiment, the control valve 118 is a normally open directional control valve. During charging of the oil tank 106, the control valve 118 operates to allow filling up of the oil tank 106 to an optimal level for gravity feed. During discharging, the control valve 118 does not operate, thereby, preventing filling of the oil tank 106 with the lubricating oil 102.

In one embodiment, the lubrication system 100 also includes a check valve 120 provided further in the flow of lubricating oil 102 from the pump 116 to the control valve 118. The lubrication system 100 also includes a pressure relief valve 122 located after the pump 116 for relieving any excess pressure in the flow line of the system 100 and the check valve 120 for preventing reverse flow. In either of the embodiments of FIG. 2 or FIG. 3, it may be useful to include one or more temperatures sensors 107 to assess ambient and/or lubrication oil temperature and use that information for controlling the amount of oil that is maintained in the hydraulic accumulator 36 of FIG. 2 or the oil tank 106 of FIG. 3.

Figure 4:
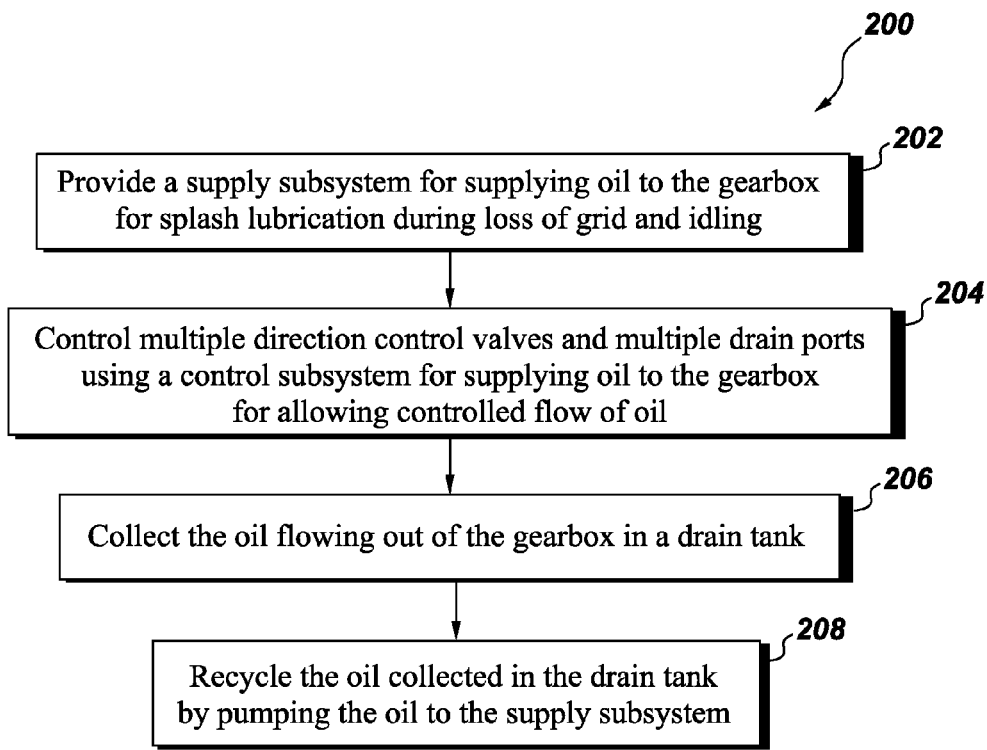
FIG. 4 is a flow chart illustrating an exemplary method for lubricating a fluid turbine gearbox in accordance with an embodiment of the invention.

FIG. 4 is a flow chart illustrating an exemplary method 200 for lubricating a wind turbine gearbox in accordance with an embodiment of the invention. The method includes providing an oil-supply subsystem for supplying oil to the gearbox for splash lubrication during loss of electric grid and idling at step 202. In one embodiment, the method includes providing a hydraulic accumulator as a supply subsystem. The hydraulic accumulator may be provided at any convenient location in a wind turbine system. In another embodiment, the method includes providing an oil tank located at a predefined elevation for supplying oil to the gearbox by gravity during loss of electric grid or idling. At step 204, the method includes controlling multiple direction control valves and multiple drain ports using a control subsystem for allowing controlled flow of lubricating oil during discharging of the supply subsystem to the wind turbine gearbox. Further, at step 206, the method includes collecting the lubricating oil flowing out of the gearbox in a drain tank during charging. The method also includes controlling multiple direction control valves and multiple drain ports located at the bottom of the gearbox using the control subsystem for allowing controlled flow of lubricating oil during charging of the supply subsystem. Finally, at step 208, the method includes recycling the lubricating oil collected at the drain tank by pumping the lubricating oil to the oil-supply subsystem.

Advantageously, the present technique ensures that the various components of the wind turbine gearbox such as bearings and the meshing gears are effectively lubricated during loss of electric grid, idling and emergency conditions such as failure or maintenance of main electric pump used for supplying oil to the gearbox. Thus, supply of lubricating oil to the wind turbine gearbox during grid loss prevents the usage of any battery backup for carrying out lubrication of the gearbox. Further, the present technique may facilitate supply of lubricating oil in a wind turbine gearbox during commissioning of a wind turbine system, when supply of electrical power for operating a lubricating pump may be intermittent. Moreover, the application of the present technique does away with the requirement of any mechanical pump conventionally employed for supplying lubricating oil to the wind turbine gearbox, which mechanical pump may be cumbersome and costly to the overall wind turbine system. Such mechanical pump may also fail while providing oil to the gearbox of the wind turbine Thus, the present invention utilizes a technique to convert a dry sump wind turbine gearbox to a wet sump wind turbine gearbox even during idling or grid loss or during emergency condition.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A lubrication system for a fluid turbine gearbox, the lubrication system comprising:
   a supply subsystem for providing oil via an oil tank or a hydraulic accumulator to a gearbox of the fluid turbine for lubrication during at least one of idling or loss of electric grid; and
   at least one solenoid valve for allowing oil to flow from the supply subsystem to the gearbox in the absence of electricity being supplied to the at least one solenoid valve for converting a dry sump gearbox to a wet sump gearbox and providing splash lubrication;
   a control subsystem for providing electricity to the at least one solenoid valve to maintain the at least one solenoid valve in a closed position when no idling or loss of electric grid conditions are occurring.

2. The lubrication system according to claim 1, wherein the supply subsystem provides oil to the gearbox by gravity.

3. The lubrication system according to claim 1, wherein the fluid turbine gearbox comprises a wind turbine gearbox or a marine hydrokinetic energy turbine gearbox.

4. The lubrication system according to claim 1, wherein the lubrication system comprises a drain tank for collecting the oil flowing out of the gearbox.

5. The lubrication system according to claim 4, wherein the lubrication system comprises a pump for pumping the oil from the drain tank to the supply subsystem.

6. The lubrication system according to claim 1, wherein the lubrication system comprises a manifold with a plurality of nozzles in the gearbox for providing a flow of pressurized oil to the plurality of components of the gearbox.

7. The lubrication system according to claim 1, wherein the supply subsystem comprises the oil tank at a predefined elevation above the gearbox for providing oil to the gearbox.

8. The lubrication system according to claim 1, wherein the lubrication system comprises a plurality of drain ports for controlling the flow of oil in the lubrication system.

9. The lubrication system according to claim 8, wherein the control subsystem further controls opening or closing of the plurality of drain ports in a drain manifold of the gearbox to permit storage of the oil at an optimal level in the gearbox for splash lubrication.

10. The lubrication system according to claim 1 further comprising at least one drain control valve for allowing oil to leave the gearbox when electricity is supplied to the at least drain control valve and further for preventing oil from leaving the gearbox in the absence of the electricity being supplied to the at least one drain control valve.

11. The lubrication system according to claim 1, wherein the lubricating oil includes additives comprising nano-particles.

12. The lubrication system according to claim 1, further comprising a temperature sensor for sensing a temperature of the fluid turbine and wherein the control subsystem is configured for controlling the flow of oil in the lubrication system at least in part based on the sensed temperature.

\* \* \* \* \*